United States Patent
Hollwedel, Jr.

[15] 3,684,366
[45] Aug. 15, 1972

[54] MACHINE FOR MAKING PRINTS FROM MICROFILM FICHE

[72] Inventor: Henry C. Hollwedel, Jr., Belmont, Calif.

[73] Assignee: George Lithograph Company, San Francisco, Calif.

[22] Filed: Sept. 8, 1970

[21] Appl. No.: 70,070

[52] U.S. Cl. ..................355/5, 353/27, 353/76, 355/45
[51] Int. Cl. ...........................G03g 15/00
[58] Field of Search ............355/5, 45; 353/27, 76

[56] References Cited
UNITED STATES PATENTS 3,547,534  12/1970  Akiyama et al..........355/45 X
3,463,585  8/1969  Levine......................355/45

Primary Examiner—Samuel S. Matthews
Assistant Examiner—Richard A. Wintercorn
Attorney—Julian Caplan

[57] ABSTRACT

A holder for a microfiche jacket is mounted on top of a viewer, a lamp directing light through the microfiche and a lens onto a pivoted mirror and thence to a ground-glass viewing screen. A support frame for the holder enables any one microfiche to be accurately centered on the lens axis, as is determined by viewing on the screen. When the mirror is pivoted out of the way, the enlarged image of the microfiche is exposed through the open top of an electrostatic copier. The image previously viewed on the screen is exactly the same as is exposed upon a sheet of copy paper positioned in the copier. Preferably the lamp has two intensities, one for screen viewing and a higher intensity for copying.

9 Claims, 6 Drawing Figures

INVENTOR.
HENRY C. HOLLWEDEL JR
BY
Julian Caplan
ATTORNEY

INVENTOR.
HENRY C. HOLLWEDEL JR

MACHINE FOR MAKING PRINTS FROM MICROFILM FICHE

This invention relates to a new and improved machine for making prints from microfiche.

A convenient commercially developed means of storing written data is the use of microfiche which are held in jackets. The microfiche are individual microfilm frames of pages of documents. Ordinarily a plurality of such microfiche relating to a single subject matter are affixed to apertured cards with a plurality of microfilm frames located on each of a plurality of horizontal lines on said card. The present invention provides a means for viewing the individual frames, focusing an enlarging lens relative to each such frame, centering the frame relative to the optical axis of the lens and then making an electrostatic print from the selected frame.

Accordingly, a principal purpose of the present invention is to provide means for efficient production of enlarged prints of individual microfiche without removing the frames from the folders or jackets. It will be understood that the microfiche in an individual card or holder are many times of random sizes and are irregularly spaced in the holder. The present invention provides a versatile means for locating the particular frame to be enlarged and then focusing a lens with respect thereto, centering the frame relative to the lens and reproducing one or more such frames. Accordingly, the present invention facilitates these individual operations.

One of the features of the invention is the provision of a microfilm viewer having a ground-glass screen on which the image of the frame is displayed, the screen being used for the positioning and focusing of the lens. The plane of the print to be exposed is the identical distance from the lens as the viewing screen. Thus when the image is properly displayed on the screen, it is automatically focused on the paper to be printed.

Another feature of the invention is the use of an electrostatic copier which has a feed for sensitized paper and which pulls the paper in position for exposure. After the paper has been exposed the machine advances the paper for developing, while the next sheet is being pulled into position and is ready for exposure. Accordingly, the present invention economizes in time of the use of the machine since the next frame to be reproduced is being located, centered and focused while the previous print is being developed.

Still another feature and advantage of the invention is the use of an improved holder and mounting for the microfiche holder. The holder and mounting enable the holder to be rapidly moved from side to side and top to bottom, there being provision for movement in two planes simultaneously or sequentially. In addition the holder is easily loaded and unloaded.

Other features of the invention relate to the focusing of the lens and the provision of a plurality of lenses of different magnifications mounted in a turret which is positioned so that each of said lenses may be used selectively.

Still another feature of the invention is the provision of a lamp for illumination of the microfiche having two intensities, the lower intensity being used for viewing through the screen and the other intensity for reproduction. Means is provided for switching from high intensity to low intensity when a mirror associated with the viewer is swung from viewing to reproducing position.

As will be understood by one skilled in the microfilm art, commercially available microfilm systems produce fiche directly as the output of a computer. Thus this system differs from that heretofore described and more completely described in the following specification in that it is unnecessary to place microfilm strips in an envelope. The machine of the present invention may be used to make prints from microfiche produced as computer output.

It will also be understood that photographic copies (duplicates) of microfiche may be used with the machine.

Additionally, by means not herein illustrated or described but which will occur to one skilled in the art, the microfilm frames may be marked with a dot or other indicium and the machine may be provided with a photocell scanner which controls movement of the carriage in which the microfilm is mounted so that each frame is sequentially moved into position for exposure.

Other objects of the present invention will become apparent upon reading the following specification and referring to the accompanying drawings in which similar characters of reference represent corresponding parts in each of the several views.

Figure 1:
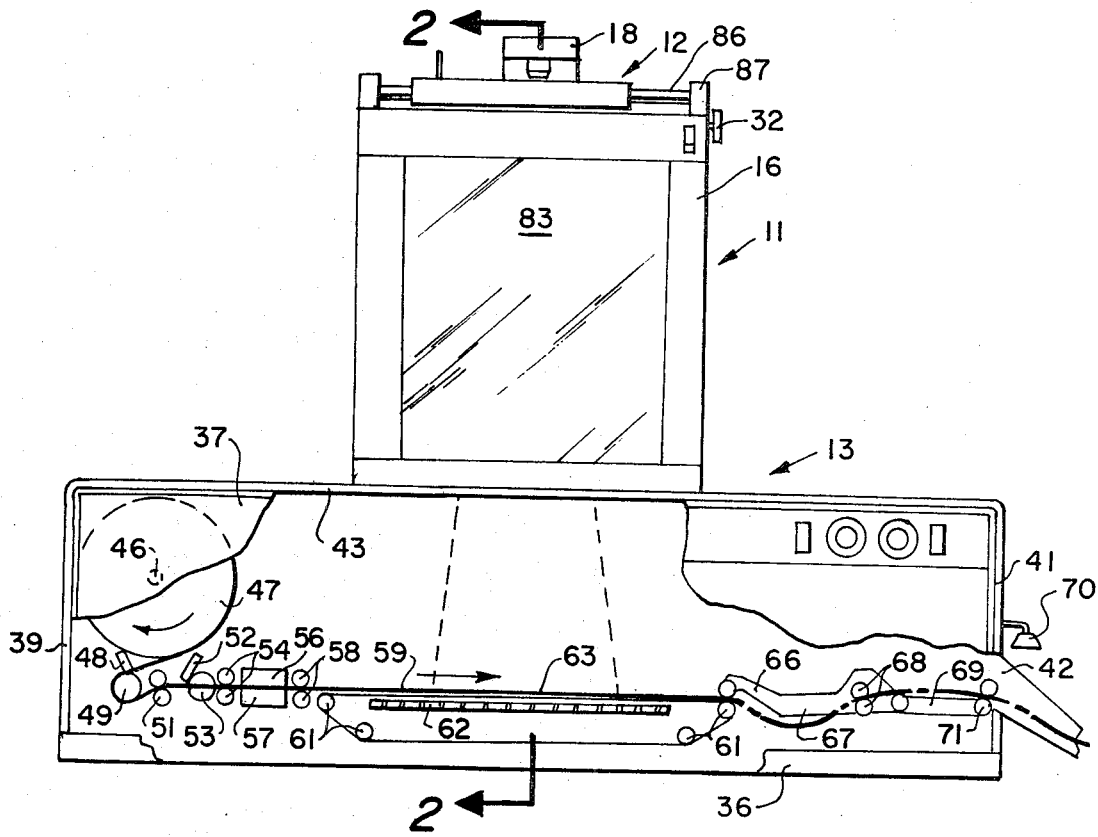
FIG. 1 is a front elevational view of the machine partially broken away in section to reveal internal construction.
Figure 2:
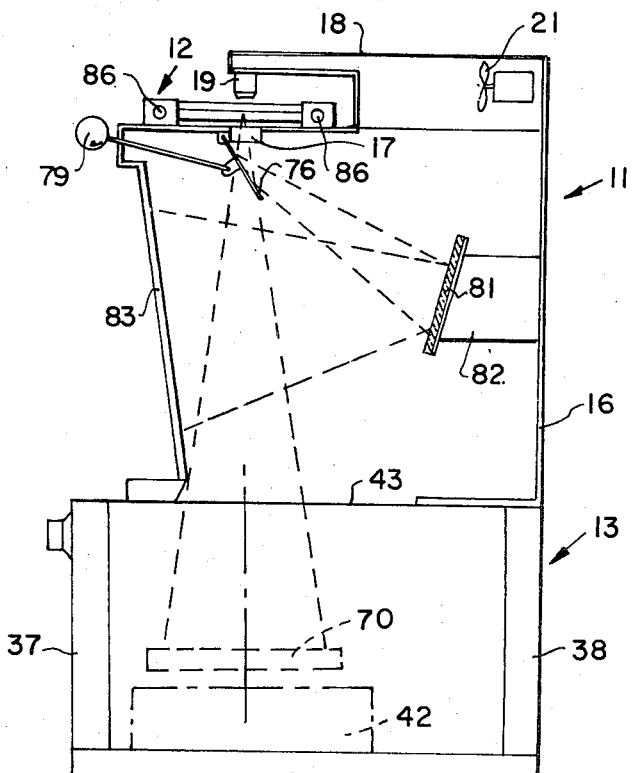
FIG. 2 is a sectional view taken substantially along the line 2—2 of FIG. 1.

The present invention comprises essentially three subassemblies, two of which are adapted from commercially available apparatus. Thus a microfilm viewer 11 of well-known type is mounted above an electrostatic printer 13 which is also commercially available but has certain parts removed and the microfiche jacket is held in a holder 12 mounted on the top of the viewer 11.

Viewer 11 has a casing 16 of sheet metal or plastic formed with an opening 17 in the top adjacent to the front. Extending upwardly and then forwardly from the top of casing 16 is a lamp support 18 from which depends a lamp 19. Lamp 19 is preferably a 200 watt quartz lamp having two intensities controlled as hereinafter explained. A motor driven blower 21 is positioned in housing 18 and directs an air stream which cools lamp 19. Switch 20 is an off-on switch for lamp 19 and the motor of fan 21.

Below opening 17 and in line with lamp 19 is a lens holder 26 which may be in the form of a turret having a plurality of lenses 27a,b,c. The periphery of holder 26 may be formed as a worm wheel 28. A worm 29 may be rotatably mounted in casing 16 and controlled by an external knob 32 so that the turret 26 may turn about shaft 31, which is supported in casing 16. It will be understood, however, that other lens mountings may be used and that a single lens rather than a turret of lenses may be substituted. Each lens is preferably individually focused by an external control (not shown) so that the particular frame being viewed may be accurately focused in the viewing screen.

Below lens 27 which is in line with lamp 19 and immediately below the microfiche being viewed in a slanted flat plane mirror 76 mounted on a frame 77 which is pivoted to bracket 78. A control 79 permits the mirror to be moved between the solid line position of FIG. 3 and the vertical or dotted line position thereof. When the mirror is in solid line position, the image of the microfiche being used is reflected at an angle to the back of the casing 16. When the mirror is retracted to vertical position the image does not impinge on the mirror 76 and is directed vertically downwardly for exposure.

For viewing purposes, a second mirror 81 is positioned near the back of viewer 11 being held permanently in position by support 82. Mirror 81 and support 82 are so located that when the mirror 76 is in exposure position they do not obstruct the image. At the front of the viewer 11 is a ground-glass screen 83 held within an opening in the front of casing 16 by mounting channels 84.

The bottom of casing 16 is open and may be supported upon copier 13. It will be understood that sometimes the documents in a microfiche holder are disposed at right angles to each other. In such instances it is preferable to mount the viewer 11 relative to copier 13 on a turntable arrangement (not shown), whereby the viewer 11 may be turned 90° relative to copier 13 so that the images of the microfiche may always be in the same direction, if this is a desired result.

Figure 5:
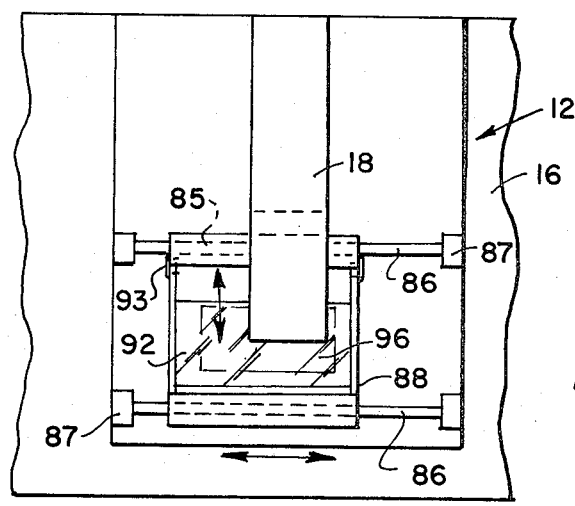
FIG. 5 is a plan view of the structure of FIG. 4.

Mounted on the top of casing 16 above opening 17 and below lamp 19 is holder 12. Two horizontal transverse shafts 86 are supported by pillow blocks 87 at either end thereof on casing 16 straddling opening 17. A rectangular frame comprising tracks 88 which are of inwardly facing channel configuration is slidably supported by shafts 86 so that the frame may move from left to right as viewed in FIG. 5. A bottom glass 89 is provided with a peripheral frame 91 which is channel shaped and which slides within the tracks 88. Thus the frame 91 may move upwardly or downwardly as viewed in FIG. 5, sliding in the channel tracks 88. In actual construction, it will be understood, the glass 89 moves in a horizontal plane forwardly and rearwardly and from left to right. The microfiche holder is supported on bottom glass 89 and is held flat by a top glass 92 which is hinged to frame 91 by means of hinges 93. A control 94 (not shown) which externally extends from the machine is attached to frame 91 and enables the user to move the microfiche 96 positioned between glasses 92 and 89 in relation to lens 27 so that the particular frame is accurately centered as viewed in screen 83.

Illustrated herein is a portion of A. B. Dick Company No. 675 Electrostatic Copier with certain parts (particularly the scanner and lamp) removed. Such copier 13 is commercially available and only a portion of its parts are illustrated. The copier uses a special paper which is coated with zinc oxide on one side to enable the paper to accept and hold an electrical charge for a short period of time. The entire zinc oxide coated side of the paper receives a negative charge. The paper becomes photo conductive when struck by light, which causes the paper to lose its negative charge. The charged paper is exposed to light passing through the microfiche and focused upon the paper by lens 27. It is an important feature of the invention that the distance from the microfiche to the plane of the paper is identical to the distance between the microfiche and the ground-glass screen 83 when the image is reflected by mirrors 76 and 81. Thus the charged paper may be exposed to light passing through the microfiche. To produce a positive plate from a positive (i.e., clear background, dark image) frame, the clear areas of the frame are enlarged and focused upon the paper and discharge the non-image area of the copy paper. The copy paper leaves the exposure bed with a latent negative charge on its surface corresponding to the dark image and of the original (positive) frame. The image is developed on the zinc oxide coated side. A (positive) toner solution consisting of carbon particles in a state of colloidal suspension in a petroleum dispersant receives the exposed paper. The carbon particles have been charged chemically to positive ions. The positively charged carbon particles are attracted to the latent, negatively charged image on the copy paper which produces the visible copy. Since the non-image area has no charge, the carbon particles are not attracted to it. Thus a positive print is produced from a positive microfilm frame. A similar procedure is used with a negative microfilm frame except that "negative" toner, having negatively charged carbon ions is attracted to the latent, positively charged image on the copy paper to produce a positive plate from a negative microfilm frame. Remaining charge on the plate is discharged as it leaves the machine.

Copier 13 has a base 36 which rests on a suitable supporting surface. Front 37, back 38, left end 39 and right end 41 extend upward from base 36, the right end 41 being provided with a discharge opening 42 through which the completed print is discharged. The top 43 in accordance with the present invention, is open, the normal cover having been removed.

Within the copier are supports 46 for a roll 47 of coated paper of the type described. Solenoid 48 controls the amount of feed of paper 47. Decurler rollers 49 remove the curl of the paper and feed rollers 51 feed the paper through the space between rotary cutter blade 53 and spring biased stationery cutter blade 52. The timing of cutter 53 is such that a piece of paper from which the print is to be made is cut to desired length. Forwarding rollers 54 then move the cut sheet between vertically spaced negative corona assembly 56 and the positive corona assembly 57. The corona assemblies provide a high voltage discharge which negatively charges the top surface of the paper. A second set of feed rollers 48 advances the cut sheet onto a plurality of transversely spaced continuous belts 59. Belts 59 are driven by belt drive rollers 61 through a chain drive (not shown) a predetermined distance such that the paper is very accurately centered relative to the optical axis of lens 27, the distance of advance depending on the length of the sheet cut and having been previously determined by test and by adjustment. Below the top stretch of belt 59 is a vacuum plate 62 which is perforated and through which air is drawn holding the paper on belts 59 at exposure position 63. After the sheet is exposed, the belts 59 are moved, passing the exposed sheet under guide 66 and into developer trough 67 which has been filled with a toner of the type described. The latent image on the print is developed. To conserve developer, squeegee rollers 68 squeeze excess toner back into the developer trough 67 and advance the print through dryer 69 and thence through discharge feed 71 and out through discharge opening 42. Lamp 70 above opening 42 discharges static and improves quality as the print is discharged. A completed print is thus produced.

In normal usage of copier 13, the microfiche 96 from which the copy is reproduced is positioned face down on glass 89 and frame 91 is moved horizontally causing light to be projected onto the sheet at the exposure bed 63. The scanner mechanism, lamp, cover glass and opaque glass associated with the scanner are removed or de-activated in accordance with the present invention. The prints are exposed directly from the holder.

An electrostatic copier using liquid toner has been described. However, as will occur to one skilled in the art, a copier using dry toner may be substituted.

ELECTRICAL CIRCUITRY

Figure 6:
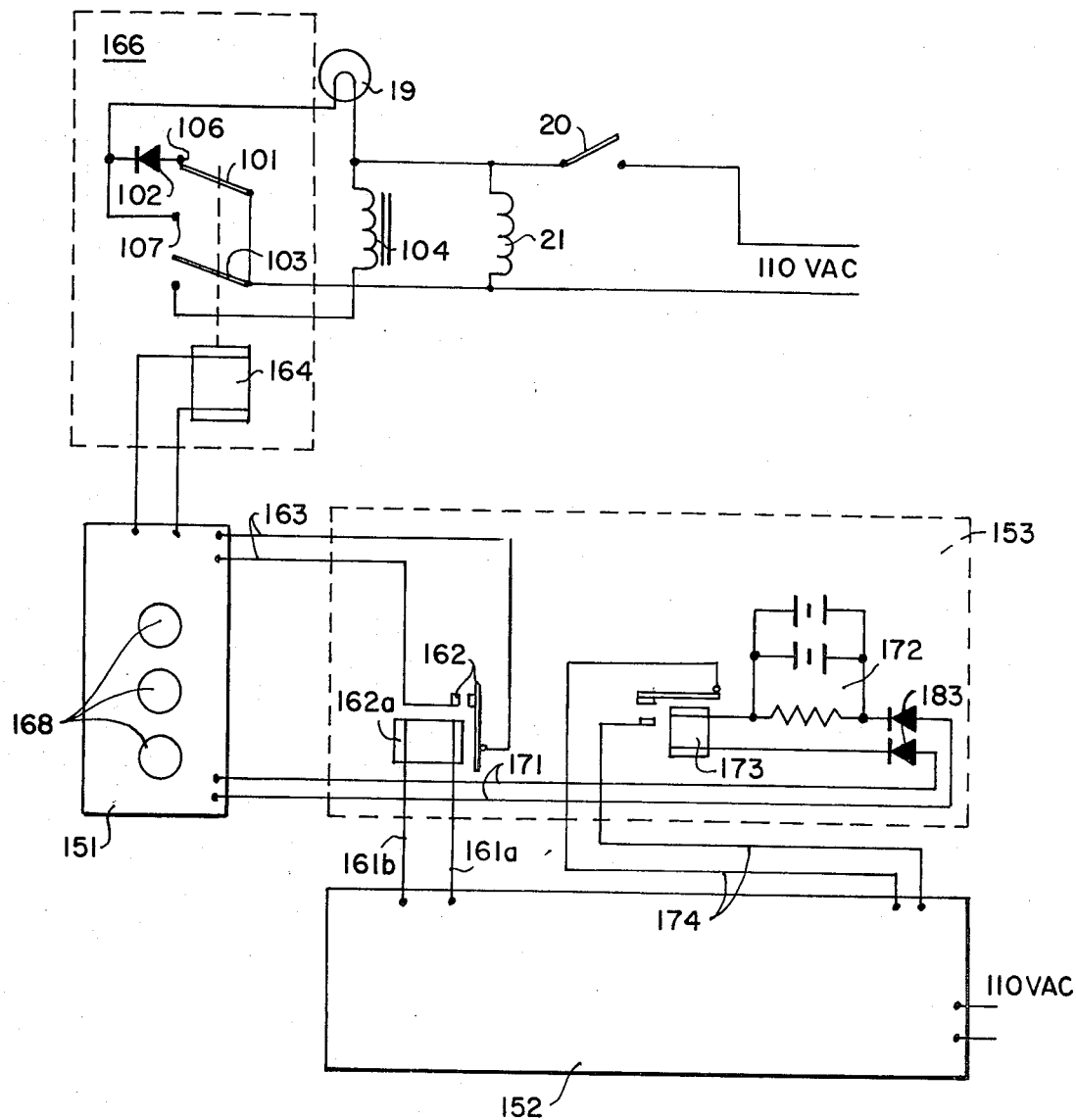
FIG. 6 is a schematic wiring diagram of the machine.

With certain modifications herein explained, the present system (see FIG. 6) may be modified to use the electrical system of a commercially available timer 151, such as Lektra Laboratories, Inc., Model TM-8 or equivalent, and the electrical system 152 of copier 13.

At one point in the cycle of copier 13 the cut sheet reaches exposure position. An impulse (which would in normal operation of the copier energize the scanner function) through wires 161 a, b energizes coil 162a in relay box 153. Closing of contacts 162 energizes the "remote start" function 163 of timer 151. Timer 151 energizes relay coil 164 of control 166 which performs two functions. In one function, solenoid 104 is energized to replace manual control 79 and move first mirror 76 out of the path of light to the dotted position of FIG. 3; switch arm 103 is closed by coil 164 to perform this function momentarily. In the other function, arm 101 is moved from contact 106 to 107. Timer 151 has a "safe-lite" function which is activated when coil 164 is de-activated. One set of wires 171 from the safe-lite function is fed into a rectifier 183 and a momentary delay 172 on relay 173. The delay allows lamp 19 to reach lower intensity status before the paper begins moving through the machine to be processed. Relay 173 closes and acts as a switch through wire 174 to recycle the electrical circuit 152 of copier 13 to print the exposed sheet and feed the next sheet into exposure position. When the latter occurs, contacts 162 are again closed. When arm 101 engages contact 106, current flows through diode 102 at reduced intensity and lamp 19 is illuminated only for scanning or viewing. When arm 101 engages contact 107, diode 102 is bypassed, and lamp 19 is at full intensity for exposure purposes. Duration of maximum intensity illumination is controlled by timer 151 and dials 168 are used to thus adjust timing.

OPERATION

Figure 3:
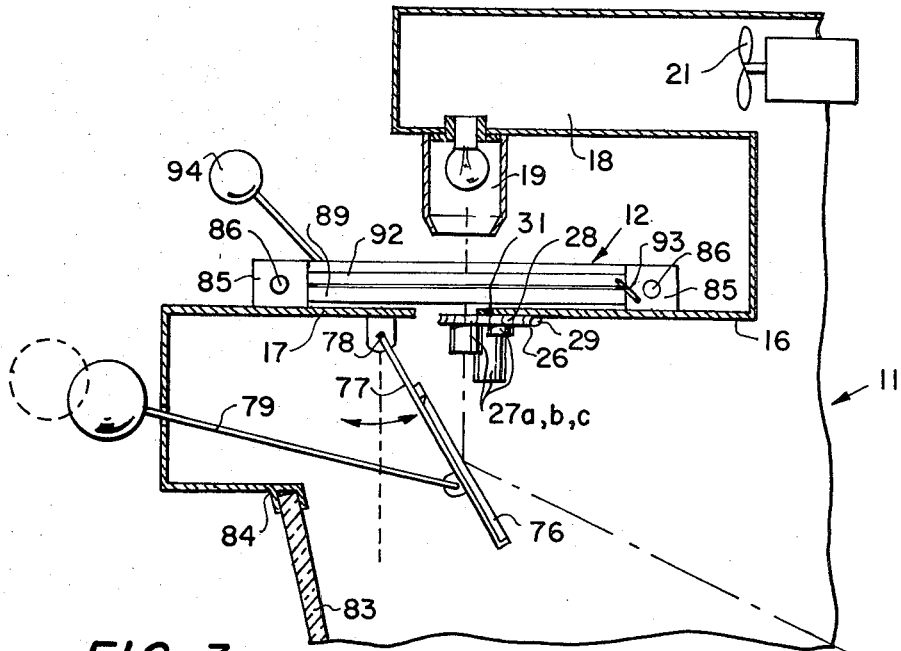
FIG. 3 is an enlarged fragmentary sectional view of a portion of structure of FIG. 2.
Figure 4:
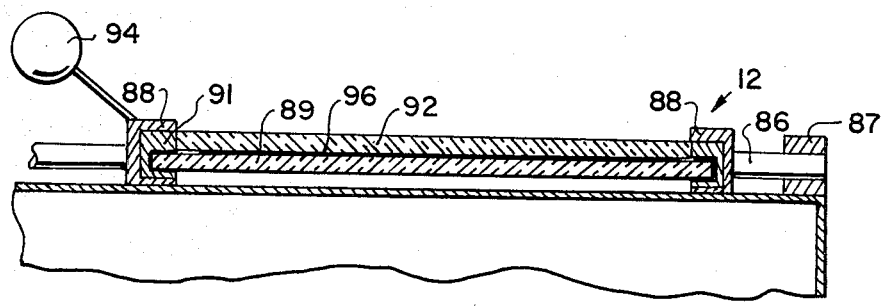
FIG. 4 is a further enlarged sectional view through the holder and its mounting.

A microfiche holder or jacket 96 is placed on bottom glass 89 after the top glass 92 has been lifted and the latter is then returned to horizontal position, holding the jacket 96 in place. Mirror 76 is positioned in reflecting position to intercept light passing through the microfiche. When mirror 76 is in such position, a switch 101 is set so that current for lamp 19 passes through diode 102. Since only one-half of the alternating current cycle passes through the diode, the lamp 19 is illuminated at its lower intensity. By means of knob 32 the proper lens 27 is located in position. The image of the microfiche 96 is displayed on glass 83 and by moving control 94 and the lens-focusing knob (not shown), the proper image is selected, centered on screen 83 and sharply focused. Thereupon the user adjusts control 79 so that mirror 76 pivots out of the path of the light into the dotted line position which is shown in FIG. 3 and such movement closes switch 101 to bypass diode 102 and cause lamp 19 to be illuminated at maximum intensity. The image then exposes print 72 in position 63. A timer 151 which is preferably adjustable and whose setting is determined by trial and error or other means causes the switch 101 and 103 to remain closed until the paper has been exposed for the proper length of time. Thereupon the feed of the copier 13 is energized causing another sheet of paper to be fed into position while the exposed paper is developed and discharged through opening 42. The operation is then ready for repetition.

What is claimed is:

1. A machine for the purpose described comprising an electrostatic copier having a casing with an open top and a support means for supporting paper for exposure below said open top; a microfilm viewer mounted above said open top, said viewer having a casing formed with a second open top, a first mirror below said second open top; means pivotally mounting said first mirror in said casing for movement between a first position to reflect light shining downward from said second open top at a downward-inward angle and a second position out of the path of said light, mirror control means for moving said first mirror between first and second positions, a second mirror in said casing positioned to reflect light from said first mirror when in first position, a viewing screen mounted in said casing and positioned to display an image of light entering from said second open top, a lens within said second opening, a lamp above said lens directed to shine through said second opening toward said support means of said copier, said lamp, said holder, said second open top, said lens, said first-mentioned open top and said support means located in a direct line in the sequence named, the distance of the light path from said lens to said screen with said first mirror in first position being identical to the distance from said lens to said support means with said first mirror in second position; a holder for microfiche mounted on said casing for movement over said second opening interposed between said lamp and said lens, said holder having a frame, a first and a second glass in said frame, one said glass movable away from the other said glass to insert a microfiche jacket into position held between said glasses, and remove said jacket from said position, and mounting means on said casing having a pair of ways for movement of said glasses in directions at right angles to each other in a plane perpendicular to a line from said lamp to said lens and means for moving said glasses in said two directions to locate a microfiche in position centered relative to said line.

2. A machine for the purpose described comprising an electrostatic copier having a casing with an open top and a support means for supporting paper for exposure below said open top; a microfilm viewer mounted above said open top, said viewer having a casing formed with a second open top, a first mirror below said second open top; means pivotally mounting said first mirror in said casing for movement between a first position to reflect light shining downward from said second open top at a downward-inward angle and a second position out of the path of said light, mirror control means for moving said first mirror between first and second positions, a second mirror in said casing positioned to reflect light from said first mirror when in first position, a viewing screen mounted in said casing and positioned to display an image of light entering from said second open top, a lens within said second opening, a lamp above said lens directed to shine through said second opening toward said support means of said copier, the distance of the light path from said lens to said screen with said first mirror in first position being identical to the distance from said lens to said support means with said first mirror in second position; a holder for microfiche mounted on said casing for movement over said second opening interposed between said lamp and said lens, said holder having a frame, a first and a second glass in said frame, one said glass movable away from the other said glass to insert a microfiche jacket into position held between said glasses, and remove said jacket from said position, and mounting means on said casing having a pair of ways for movement of said glasses in directions at right angles to each other in a plane perpendicular to a line from said lamp to said lens and means for moving said glasses in said two directions to locate a microfiche in position centered relative to said line, said copier comprising storage means for paper, said paper of the type coated with a material which holds an electrostatic charge which is discharged by exposure to light, corona means for applying a static charge to said paper, a toner trough for subjecting said paper to a toner chemical comprising carbon ions in a dispersant, transport means for advancing said paper from said storage means through said corona means to said support means, holding said paper at said support means, and then advancing said paper through said toner trough to the exterior of said casing, and a drive for said transport means.

3. A machine according to claim 2, in which said copier further comprises means for supporting a roll of paper at said storage means and cutting means to sever a sheet of predetermined length from said roll as said transport means moves said paper toward said support means.

4. A machine according to claim 2, which further comprises positive carbon ions dispersed in liquid in said toner trough.

5. A machine for the purpose described comprising an electrostatic copier having a casing with an open top and a support means for supporting paper for exposure below said open top; a microfilm viewer mounted above said open top, said viewer having a casing formed with a second open top, a first mirror below said second open top; means pivotally mounting said first mirror in said casing for movement between a first position to reflect light shining downward from said second open top at a downward-inward angle and a second position out of the path of said light, mirror control means for moving said first mirror between first and second positions, a second mirror in said casing positioned to reflect light from said first mirror when in first position, a viewing screen mounted in said casing and positioned to display an image of light entering from said second open top, a lens within said second opening, a lamp above said lens directed to shine through said second opening toward said support means of said copier, the distance of the light path from said lens to said screen with said first mirror in first position being identical to the distance from said lens to said support means with said first mirror in second position; a holder for microfiche mounted on said casing for movement over said second opening interposed between said lamp and said lens, said holder having a frame, a first and a second glass in said frame, one said glass movable away from the other said glass to insert a microfiche jacket into position held between said glasses, and remove said jacket from said position, and mounting means on said casing having a pair of ways for movement of said glasses in directions at right angles to each other in a plane perpendicular to a line from said lamp to said lens and means for moving said glasses in said two directions to locate a microfiche in position centered relative to said line, one of said ways comprising a pair of rods supported parallel to each other on the top of said casing on opposite sides of said second opening, said frame having a pair of slides to receive said rods for reciprocal movement of said frame longitudinally of said rods.

6. A machine according to claim 5, in which said frame is generally rectangular and formed with opposed, inward facing channels perpendicular to said rods, one said glass sliding within said channels.

7. A machine for the purpose described comprising an electrostatic copier having a casing with an open top and a support means for supporting paper for exposure below said open top; a microfilm viewer mounted above said open top, said viewer having a casing formed with a second open top, a first mirror below said second open top; means pivotally mounting said first mirror in said casing for movement between a first position to reflect light shining downward from said second open top at a downward-inward angle and a second position out of the path of said light, mirror control means for moving said first mirror between first and second positions, a second mirror in said casing positioned to reflect light from said first mirror when in first position, a viewing screen mounted in said casing and positioned to display an image of light entering from said second open top, a lens within said second opening, a lamp above said lens directed to shine through said second opening toward said support means of said copier, the distance of the light path from said lens to said screen with said first mirror in first position being identical to the distance from said lens to said support means with said first mirror in second position; a holder for microfiche mounted on said casing for movement over said second opening interposed between said lamp and said lens, said holder having a frame, a first and a second glass in said frame, one said glass movable away from the other said glass to insert a microfiche jacket into position held between said glasses, and remove said jacket from said position, and mounting means on said casing having a pair of ways for movement of said glasses in directions at right angles to each other in a plane perpendicular to a line from said lamp to said lens and means for moving said glasses in said two directions to locate a microfiche in position centered relative to said line, and electrical means associated with said lamp and including a switch to control intensity of illumination of said lamp, said switch in one position energizing said lamp to higher intensity than when in a second position.

8. A machine according to claim 7, in which said switch and said mirror control means are interconnected to intensify illumination of said lamp when said first mirror is in second position.

9. A machine for the purpose described comprising an electrostatic copier having a casing with an open top and a support means for supporting paper for exposure below said open top; a microfilm viewer mounted above said open top, said viewer having a casing formed with a second open top, a first mirror below said second open top; means pivotally mounting said first mirror in said casing for movement between a first position to reflect light shining downward from said second open top at a downward-inward angle and a second position out of the path of said light, mirror control means for moving said first mirror between first and second positions, a second mirror in said casing positioned to reflect light from said first mirror when in first position, a viewing screen mounted in said casing and positioned to display an image of light entering from said second open top, a lens within said second opening, a lamp above said lens directed to shine through said second opening toward said support means of said copier, the distance of the light path from said lens to said screen with said first mirror in first position being identical to the distance from said lens to said support means with said first mirror in second position; a holder for microfiche mounted on said casing for movement over said second opening interposed between said lamp and said lens, said holder having a frame, a first and a second glass in said frame, one said glass movable away from the other said glass to insert a microfiche jacket into position held between said glasses, and remove said jacket from said position, and mounting means on said casing having a pair of ways for movement of said glasses in directions at right angles to each other in a plane perpendicular to a line from said lamp to said lens and means for moving said glasses in said two directions to locate a microfiche in position centered relative to said line, and a lens turret having a plurality of lenses of different magnifications and means to selectively position one of said lenses in the path of light from said lamp through a microfiche.

* * * * *